A. P. LANDOLL.
SPRING WHEEL.
APPLICATION FILED DEC. 18, 1915.

1,231,389.

Patented June 26, 1917.
3 SHEETS—SHEET 1.

Witnesses
Frederick W. Ely,
Wm R Smith

Inventor
Albert P. Landoll.

By Victor J. Evans
Attorney

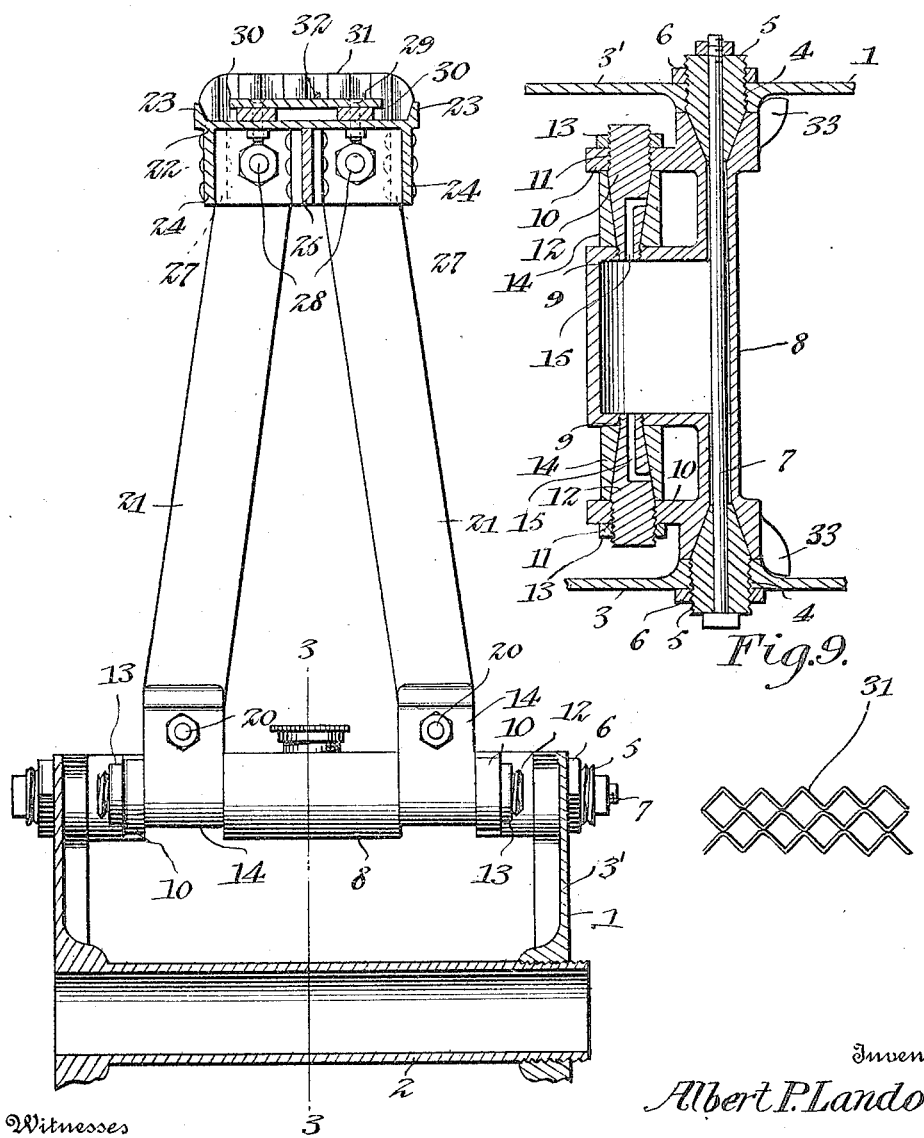

A. P. LANDOLL.
SPRING WHEEL.
APPLICATION FILED DEC. 18, 1915.
1,231,389.
Patented June 26, 1917.
3 SHEETS—SHEET 3.
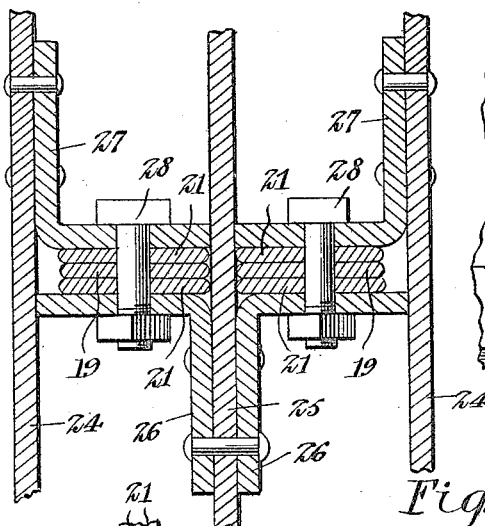
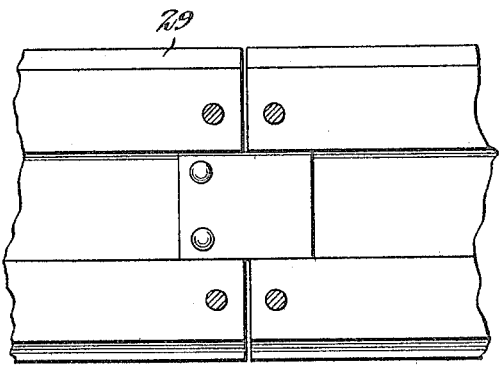
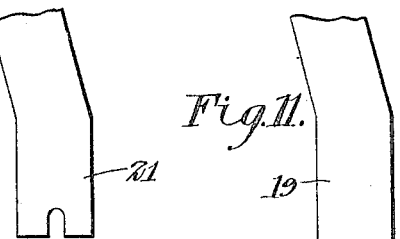
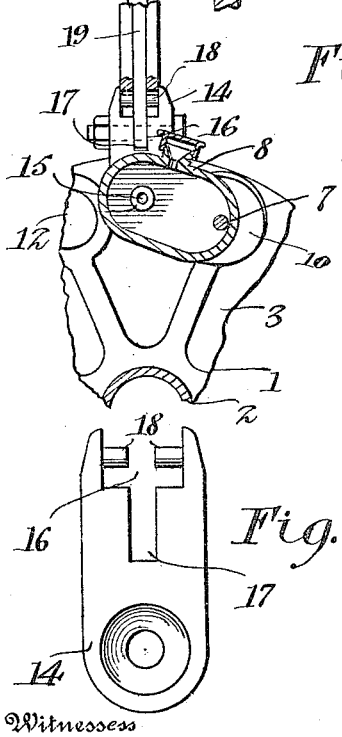
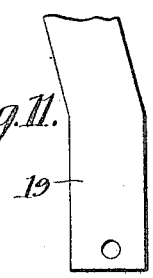
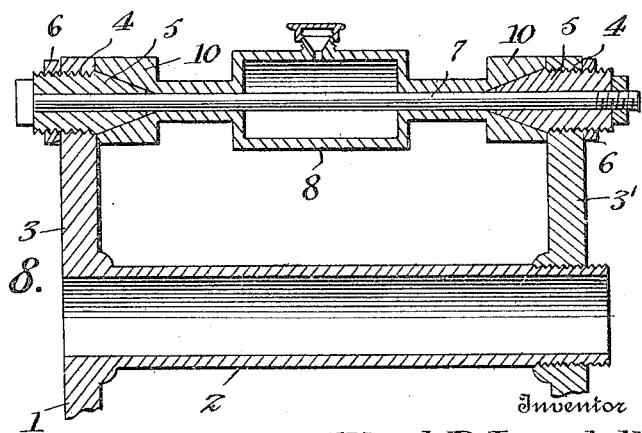
Witnesses
Frederick W. Ely,
Wm. P. Smith
Inventor
Albert P. Landoll.
By Victor J. Evans
Attorney

UNITED STATES PATENT OFFICE.

ALBERT P. LANDOLL, OF LAWTON, OKLAHOMA.

SPRING-WHEEL.

1,231,389.

Specification of Letters Patent.  Patented June 26, 1917.

Application filed December 18, 1915. Serial No. 67,646.

*To all whom it may concern:*

Be it known that I, ALBERT P. LANDOLL, a citizen of the United States, residing at Lawton, in the county of Comanche and State of Oklahoma, have invented new and useful Improvements in Spring-Wheels, of which the following is a specification.

This invention relates to spring wheels and has for its primary object to provide a device of the character set forth in which the parts are so arranged as to subject those spokes capable of giving the greatest amount of resiliency to the greatest amount of stress, that is to say, those spokes passing through the position where they can give the greatest amount of resiliency to the wheel will be subjected to the greatest strain.

My invention also makes use of a rigid as well as a slidable connection between the hub member and the rim for accommodating the arcuate shape to which certain spokes are thrown when being subjected to the stress.

An important feature of my invention is the novel manner of connecting the spring strips that form the spokes to the hub so as to subject those spokes that are in a position to give the greatest amount of resiliency to the greatest amount of stress.

Another important feature of my invention is the arrangement of the parts so that only the resiliency of the strips forming the spokes will oppose movement of the rim of the wheel, that is to say, those spokes that are in a vertical position are allowed free vertical movement and downward movement in such a manner as to not offer any resistance to the movement of the rim.

With these and other objects in view the invention consists in the construction, combination and arrangement of parts as will be hereinafter more fully described, illustrated in the accompanying drawings and pointed out in the claims hereunto appended.

In the drawings, Figure 1 is a side elevation of the wheel, one hub plate being partly broken away.

Fig. 2 is a section on line 2—2 of Fig. 1.

Fig. 3 is a section on line 3—3 of Fig. 2.

Fig. 4 is an enlarged circumferential section through the rim portion of the wheel.

Fig. 5 is an enlarged transverse section through the hub portion of the wheel.

Fig. 6 is a longitudinal sectional view illustrating the manner of supporting the strips.

Fig. 7 is a detailed view of the rim portion of the wheel.

Fig. 8 is a detailed view of one of the brackets.

Fig. 9 is a detailed view of a portion of the tread member.

Figs. 10 and 11 are detailed views of the strips.

Figure 1:
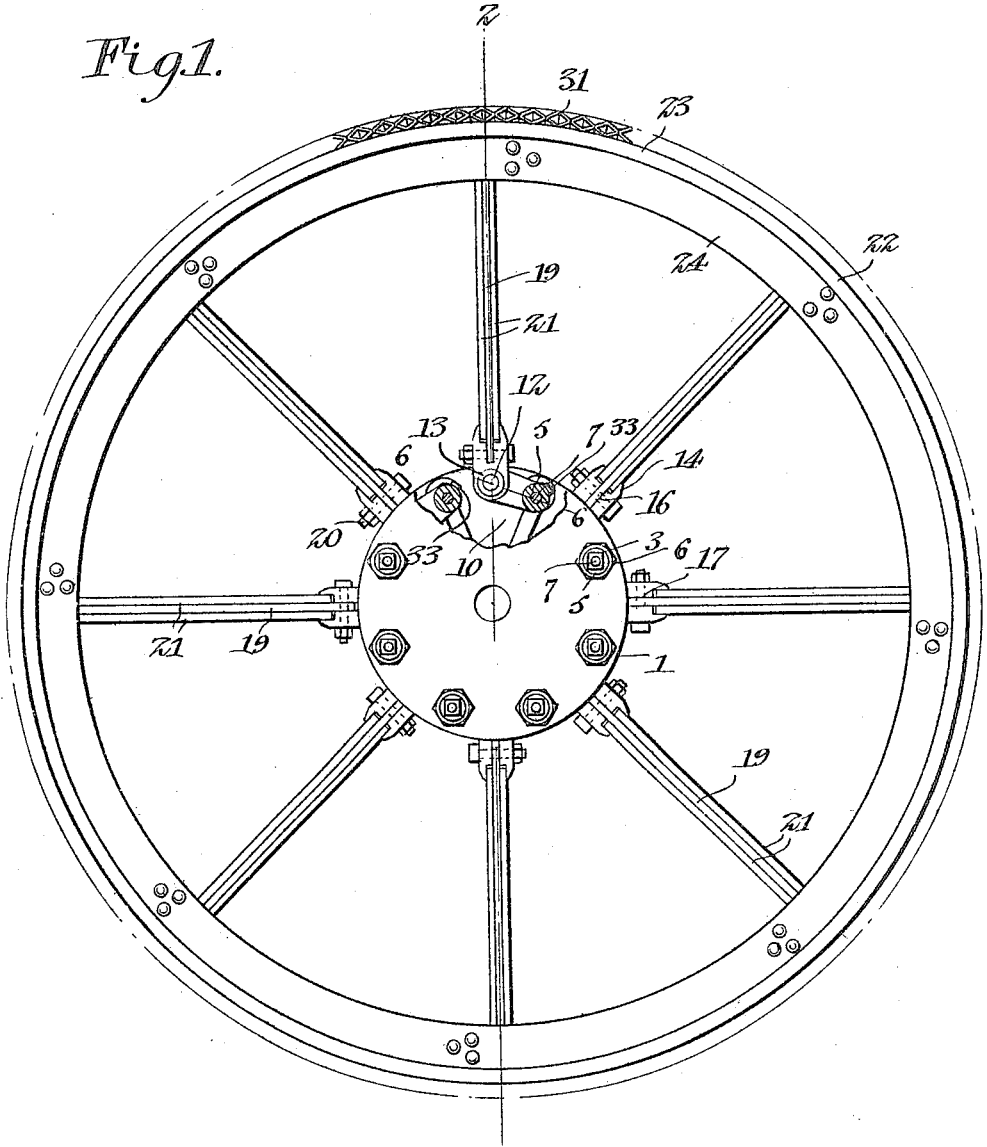

In the drawings the numeral 1 designates the hub member shown in this particular instance as formed from a tube 2 formed integral with one end plate 3 and having screw-threading attachment with another end plate 3', said plates being arranged in spaced relation. Each plate is cut away at spaced intervals for obtaining the benefit of lightness and at the same time to accomplish the purpose hereinafter described.

Each of the side plates is provided with an annular series of threaded passages 4, the passages of one plate being arranged in axial alinement with the passages of the opposite plates and threaded into each passage is a cone bearing 5 locked in place by the means of a nut 6. Passing axially through the cone, that is to say, to each pair of cones in axial alinement is a bolt 7 upon which is mounted an oil cup 8 also provided with threaded passages 9. Rotatably mounted on the cone portions of the bearings 5 are arms 10, each of these arms 10 being provided with a threaded opening 11 that accommodates the threaded end of a second cone bearing 12, which is in turn held against movement by means of a nut 13. The cone 12 also has screw threaded engagement at one end with the threaded passage 9 of the oil cup 8. For allowing oil to feed to the contacting surfaces between the cone 12 and clips 14 that are rotatably mounted on the cones, I provide each cone with a passage 15 that communicates with the interior of the oil cup and with the contacting surface. Each clip 14 is provided with a recess 16 in direct communication with a slot 17 and projecting into the recess 16 are oppositely arranged lugs 18. In place of the ordinary rigid spokes I provide an annular series of sets of resilient strips, each set including a central strip 19 that has one extremity arranged in the slot 17 which is rigidly held against displacement by means of a bolt 20 that passes through the clip in a transverse direction and also through the extremity of the central strip, the remaining extremity of the central strip having a rigid connection with the rim in a manner to be described later.

Slidably engaging the opposite sides of the central strips 19 is a pair of strips 21 of a length less than the central strip 19 and which have their inner extremities arranged in the recess 16 in such a manner as to allow a sliding movement between the extremities of the strips and the walls of the recess and the central strip. In this particular instance the lugs 18 are arranged in slots in the ends of the strips 21 so as to allow longitudinal movement of the strips 21 but not edgewise movement. These strips 21 also have a rigid connection with the rim in a manner hereinafter described.

The numeral 22 designates the rim provided with marginal flanges 23, the said rim also including a pair of inwardly extending rings 24 integrally secured to the inner surface of the main element of the rim and between which is arranged a third ring 25. The three rings are arranged in spaced relation so as to accommodate the outer ends of the strips that form the spokes.

In this particular embodiment of my invention I have shown sixteen sets of strips, every two sets taking the place of a spoke, as shown, and each two sets converging toward each other toward the rim 22 so as to reinforce the rim against lateral movements. To the central ring at spaced intervals I also secure L-shaped brackets 26 that coöperate with L-shaped brackets 27 that are in turn secured to the rings 24 and between the brackets 27 and the brackets 26 are arranged the ends of the strips which are rigidly held against movement by means of the bolts 28 passing through the brackets. At this point attention is called to the fact that owing to the relation between the brackets carried by the central ring and the bolts 28 the ring 25 will be given circumferential movement when the bolts are tightened, thus it will be seen that upon tightening of a pair of bolts for bringing closer together four of the brackets the remaining brackets will be brought closer together through the action of the circumferential movement of the central ring 25. Secured to the outer peripheral surface of the rim 22 are plates 29 which in turn engage recesses 30 formed in a yieldable tread 31. The tread portion of my improved wheel is made from corrugated metallic strips, the corrugation extending transversely of the rim. For effectively holding the tread against centrifugal action I pass through the central portion of the tread a tie wire 32.

For limiting the movement of the arms 10 I form each arm with a lug 33 adapted in the arcuate travel of the arm to engage a wall of one of the recesses in the side plates.

From the foregoing description taken in connection with the accompanying drawing the advantages of the construction, and methods of operation will be readily apparent to those skilled in the art to which the invention relates, and while I have described the principle and operation of the invention together with the device which I now consider to be the best embodiment thereof, I desire it to be understood that the device shown is merely illustrative and that such changes may be made when desired as fall within the scope of the claims.

What I claim is:—

1. A spring wheel comprising a rim, a hub, and spokes between the rim and hub, each of said spokes comprising an inner spring strip and outer spring strips, means carried by the hub and relatively movable with relation to the hub and receiving the inner ends of the strips, whereby to secure the central strip thereto and permit of the sliding movement of the outer strips, and rings secured to said rim and rigidly attached to the outer ends of the said strips, one of said rings being mounted for circumferential movement.

2. A spring wheel comprising a rim, a hub and spokes between the rim and hub, arms journaled on bearings in the hub, means for limiting the swinging of the arms, elements carried by the arms, each of said spokes comprising an inner spring strip and outer spring strips, a rigid connection between each of the mentioned elements and the inner strip, a slidable connection between each of the said elements and the outer strips, and rings secured to the rim and rigidly attached to the outer ends of the spokes, one of said rings being mounted for circumferential movement.

3. A spring wheel comprising a rim, a hub and spokes between the rim and hub, said spokes each comprising an inner flat spring strip and outer flat spring strips of less length than the inner strip, arms journaled in bearings on the hub, means for limiting the swinging of the arms, bearing members carried by the arms, elements mounted upon the bearings, a rigid connection between each of the said elements and the central strip of each of the spokes, a slidable connection between each of the said elements and the outer strips of each of the spokes, rings secured to the rim and rigidly attached to the outer ends of the spokes, one of said rings being mounted for circumferential movement.

4. A spring wheel comprising a rim, a hub and spokes between the rim and hub, arms journaled on the hub, means for limiting the movement of said arms with respect to the hub, slotted clips journaled upon the arms, each of the mentioned spokes comprising an inner flat spring strip, and outer flat spring strips, the inner ends of said strips being received in the slots of the clips, means for rigidly securing the inner strips to the clips, means for slidably associating the outer strips with the clips, rings secured to the rim and rigidly attached to the outer ends of the spokes, one of said rings being mounted for circumferential movement.

5. A spring wheel comprising a rim, a hub and spokes between the rim and hub, arms journaled upon the hub, means for limiting the movement of the arms with respect to the hub, slotted clips journaled upon the arms, inturned lugs carried by the clips, said spokes comprising an inner spring strip and outer spring strips of less length than the inner strips, the ends of said strips being received in the slots of the clips, the ends of the outer strips being slotted to receive the lugs of the clips, means for rigidly securing the inner strips to the clips, rings secured to the rim and rigidly attached to the outer ends of the spokes, one of said rings being mounted for circumferential movement.

In testimony whereof I affix my signature in presence of two witnesses.

ALBERT P. LANDOLL.

Witnesses:
MARK LANDOLL,
J. A. LANDOLL.